(12) United States Patent
Morita et al.

(10) Patent No.: US 7,070,877 B2
(45) Date of Patent: Jul. 4, 2006

(54) STAINLESS STEEL SEPARATOR FOR LOW-TEMPERATURE FUEL CELL

(75) Inventors: Yoshikazu Morita, Sakai (JP); Shinichi Kamoshida, Sakai (JP); Takeshi Shimizu, Sakai (JP); Tsutomu Miyano, Sakai (JP); Keiji Izumi, Sakai (JP); Yuichi Yagami, Susono (JP); Tsuyoshi Takahashi, Aichi-ken (JP); Yoshiaki Kajikawa, Aichi-ken (JP); Kouta Kodama, Toyota (JP)

(73) Assignees: Nisshin Steel Co., Ltd. (JP); Toyota Jidosha Kabushiki Kaisha (JP)

( * ) Notice: Subject to any disclaimer, the term of this patent is extended or adjusted under 35 U.S.C. 154(b) by 304 days.

(21) Appl. No.: 10/405,895

(22) Filed: Apr. 2, 2003

(65) Prior Publication Data
US 2003/0224236 A1    Dec. 4, 2003

(30) Foreign Application Priority Data
Apr. 3, 2002    (JP)    ............................. 2002-101602

(51) Int. Cl.
*H01M 2/00*    (2006.01)
(52) U.S. Cl. ...................................................... 429/34
(58) Field of Classification Search .................. 429/34
See application file for complete search history.

(56) References Cited

U.S. PATENT DOCUMENTS

| 6,440,598 | B1 | 8/2002 | Fukui et al. | 429/34 |
| 6,835,487 | B1 * | 12/2004 | Takao et al. | 429/34 |

FOREIGN PATENT DOCUMENTS

| EP | 1 094 535 A1 | 4/2001 |
| EP | 1 235 290 A2 | 8/2002 |
| JP | (1996) 08180883 A | 7/1996 |
| JP | (1999) 11121018 A | 4/1999 |
| JP | (1999) 11126621 A | 5/1999 |
| JP | (1999) 11126622 A | 5/1999 |
| JP | (2001) 2001032056 A | 2/2001 |
| JP | (2001) 2001214286 A | 8/2001 |
| JP | 2002-367622 | * 12/2002 |
| JP | 2002367622 A | 12/2002 |

* cited by examiner

*Primary Examiner*—Patrick Joseph Ryan
*Assistant Examiner*—Thomas H. Parsons
(74) *Attorney, Agent, or Firm*—The Webb Law Firm

(57) ABSTRACT

A stainless steel separator, which is good of corrosion-resistance and low of contact-resistance, is proposed for a fuel cell. Its surface faced to a fuel electrode is pickled, which the other surface faced to an oxidizing electrode is roughened by electrolytic etching or the like. The roughening treatment may be performed before or after pickling and passivation. The roughened surface of the stainless steel separator without pickling or passivation may be faced to the oxidizing electrode.

3 Claims, 1 Drawing Sheet

STAINLESS STEEL SEPARATOR FOR LOW-TEMPERATURE FUEL CELL

BACKGROUND OF THE INVENTION

1. Field of the Invention

The present invention relates to a stainless steel separator for such a fuel cell as a solid polymer-type, which is driven at a low temperature.

2. Description of the Related Art

A solid polymer-type fuel cell has the advantage that it is started in a short time and driven at a temperature lower than 100° C., in comparison with other types of fuel cells. Since it is built up by all solid members with simplified structure, it is maintained with ease and suitable for use in an environment subjected to vibrations or shocks. Moreover, it can be designed to small size due to high power density, and a fuel is efficiently consumed for power generation with less noise. Accounting these advantages, applicability of the solid polymer-type fuel cell to a power source of an automobile has been researched and examined in these days. Provided that a fuel cell, which gains the same mileage as a gasoline engine, is offered, an automobile can be driven under very clean conditions without generation of $NO_X$ and $SO_X$. Discharge of $CO_2$ can be also remarkably reduced.

A solid polymer-type fuel cell involves a solid macromolecular membrane which includes a proton-exchange group in its molecule and acts as a proton-transferring electrolyte. This type fuel cell is driven by the same way as other types of fuel cells, i.e. supply of a fuel gas such as hydrogen to one side of the membrane while supply of an oxidizing gas such as oxygen to the other side of the membrane.

A representative solid polymer-type fuel cell is built up by bonding graphite electrodes, i.e., an oxidizing electrode 2 (cathode) and a fuel electrode 3 (anode), respectively to both surfaces of a solid macromolecular membrane 1, and locating the membrane 1 together with gaskets 4, 4 between separators 5 and 5, as shown in FIG. 1A. The separator 5 faced to the oxidizing electrode 2 has an oxygen-supply opening 6 and an oxygen-discharge opening 7 formed therein, while the separator 5 faced to the fuel electrode 3 has a hydrogen-supply opening 8 and a hydrogen-discharge opening 9 formed therein. Air may be supplied through the opening 6 to the oxidizing electrode 2, instead of oxygen.

A plurality of grooves 10, which extends along flow directions of hydrogen (g) and oxygen (o), are formed in the separators 5, 5 in order to ensure sufficient supply and uniform distribution of hydrogen (g) and oxygen (o). Water-cooling means, whereby coolant water is supplied from openings 11, circulated in the separators 5, 5 and then drained from openings 12, are also built in the separators 5, 5 in order to release a heat during power generation.

Hydrogen (g) is fed from the opening 8 to a space between the fuel electrode 3 and the separator 5. Hydrogen (g) becomes a proton after discharge of an electron. The proton transfers through the membrane 1 and accepts an electron at the oxidizing electrode 2. Thereafter, hydrogen is burnt with oxygen (o) or air fed to a space between the oxidizing electrode 2 and the separator 5. Electric power is outputted by connecting a load resistor between the oxidizing electrode 2 and the fuel electrode 3.

Since electric power generated by one fuel cell is very tiny, a plurality of cells each composed of the membrane 1 sandwiched between the separators 5, 5 are stacked together, as shown in FIG. 1B, in order to accumulate electric power to a level suitable for practical use. However, power-generating efficiency is substantially varied in accordance with electric resistance concerning contact of the separators 5, 5 with the graphite electrodes 2,3 as well as bulk resistance of the separators 5, 5 in the stacked assembly. Accumulation of power-generating efficiency needs separator material good of electric conductivity with small contact-resistance in contact with a graphite electrode. In this sense, a graphite separator has been used so far in the same way as in a phosphate-type fuel cell.

A graphite separator is manufactured by cutting a graphite block to a predetermined shape and machining the shaped block for formation of various openings and grooves. Due to the manufacturing process, a large sum of expenses is inevitably required for material and processing. As a result, a fuel cell becomes very expensive in total, and productivity is also inferior. Moreover, a separator made of brittle graphite is easily damaged by vibrations or shocks. These disadvantages are eliminated by use of a metal separator instead of a graphite separator. The metal separator is manufactured by punching or pressing a metal sheet, as disclosed in JP 8-180883 A.

A metal separator is fairly superior of various properties, e.g. shock-resistance gas-impermeability and strength, compared with a carbon separator. But, prior art merely suggest applicability of the metal separator to a solid polymer-type fuel cell, but do not actually propose the metal material, which is good of electric conductivity and corrosion-resistance necessary for the purpose.

Stainless steel is a representative material resistant to a strong acid. Its acid-resistance is derived from a tough passive film formed on its surface, but the passive film causes increase of surface or contact-resistance. As increase of contact-resistance, a large amount of Joule heat is generated in the contact area. Consequently, an electric energy is consumed as a heat loss, and power-generating efficiency of a fuel cell is significantly reduced. Formation of a coating layer excellent in both electric conductivity and corrosion-resistance is one idea for improvement of electric conductivity of a metal separator. In this concern, the metal separator proposed by JP 8-180883 A is coated with a noble metal. However, the coating with an expensive noble metal raises a cost of a fuel cell and puts economical restrictions on development of a fuel cell. There is another idea for reduction of contact-resistance by formation of a carbonaceous coating layer, but a manufacturing process is complicated and expensive.

SUMMARY OF THE INVENTION

The present invention aims at provision of a new stainless steel separator having each surface reformed to a state suitable at each side of oxidizing and fuel electrodes.

The separator proposed by the present invention is made from a stainless steel sheet having both surfaces each reformed to a state different from the other. One surface, which is faced to a fuel electrode, is pickled and then optionally passivated. The other surface, which is faced to an oxidizing electrode, is roughened. The other surface may be pickled or passivated before or after roughening treatment.

DETAILED DESCRIPTION OF THE INVENTION

Figure 1A:
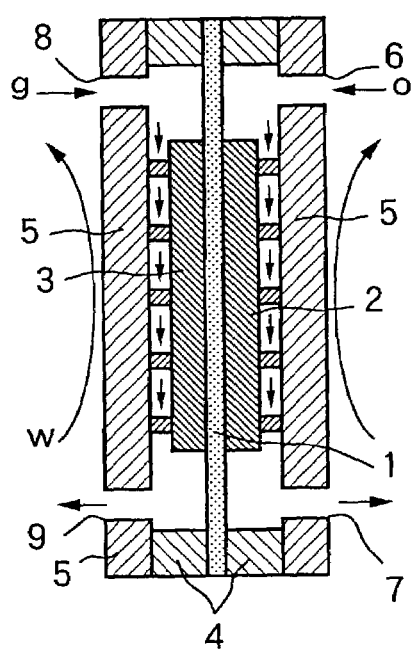
FIG. 1A is a sectional view for explaining internal structure of a fuel cell having a solid macromolecular membrane as electrolyte.
Figure 1B:
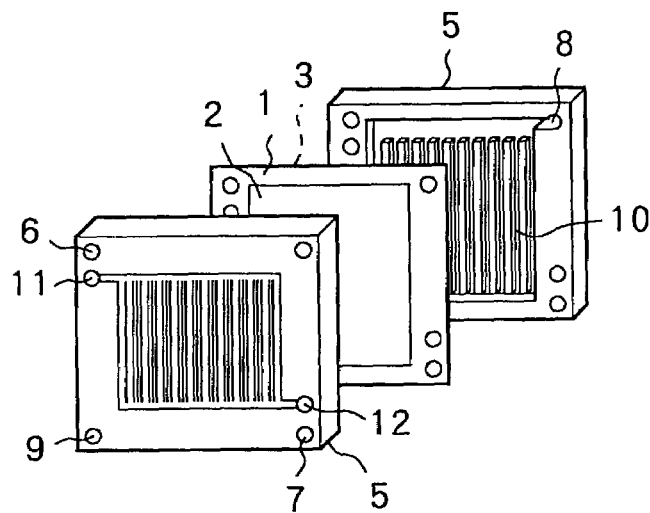
FIG. 1B is an exploded view of the fuel cell.

Since members of a fuel cell are exposed to corrosive atmospheres different between oxidizing and fuel sides, material design shall be determined in correspondence to the corroding conditions. For instance, when there is a denatured layer or brittle oxide film on a surface of a stainless steel separator installed in the fuel cell, a solid macromolecular membrane 1 is contaminated by dissolution of the denatured layer or oxide film at the beginning of cell reaction, resulting in decrease of power generating efficiency. Therefore, dissolution of metal ions shall be suppressed in order to inhibit invasion of metal ions into the macromolecular membrane in addition to decrease of contact-resistance between gas diffusion electrodes 2, 3 and a metal separator.

Contact resistance of a separator 5 with the electrodes 2, 3 can be reduced by coating the separator 5 with an electric conductive metal. However, the separator 5 coated with the metal layer has the disadvantage that metal ion is dissolved from the metal layer at the fuel side, transferred through the macromolecular membrane 1 and is oxidized at the oxidizing electrode 2. Contamination of the macromolecular membrane 1 with the metal ion is unfavorable for transportation of proton, and oxidation of the metal ion results in unexpected increase of internal-resistance. Dissolution of the metal ion and oxidation of the coating layer can be inhibited by formation of a noble metal layer, but the separator coated with a noble metal layer is very expensive.

In case of a stainless steel separator, a passive film is gradually dissolved from a surface of a stainless steel sheet at the fuel side due to hydrogen generated by cell reaction. Dissolution of the passive film leads to appearance of a metallic surface and reduces contact-resistance from the beginning of cell reaction. Accounting these reaction at the fuel side, pickling for pre-removal of passive films, brittle oxides and denatured layers effectively inhibits output loss caused by contact-resistance and suppresses dissolution of metal ion at the beginning of cell reaction. Especially, a passive film formed by passivation treatment after pickling is very thin, tough and Cr-enriched enough to inhibit dissolution of metal ion, compared with a spontaneous passive film. Although the passive film itself is nonconductive, contact-resistance between the separator 5 and the electrode 3 is reduced. Reduction of contact-resistance might be originated in tunneling current through the thin passive film.

On the other hand, a passive film grows thicker with increase of contact-resistance on the other surface faced to the oxidizing electrode 2 in an oxidizing atmosphere. Increase of contact-resistance is suppressed by roughening (reforming) the surface so as to well fit the separator with the oxidizing electrode 2.

In short, a stainless steel sheet useful as a low-cost separator for a fuel cell is offered, by pickling and optionally passivating its one surface faced to a fuel electrode 3, while roughening the other surface faced to the oxidizing electrode 2.

A separator material may be any of ferritic, austenitic and dual-phase stainless steel sheets. After the stainless steel sheet is press-reformed to a product shape having passages of fuel and oxidizing gases, it is degreased, washed and then pickled in a non-oxidizing acid such as sulfuric or hydrochloric acid. For instance, the reformed stainless steel sheet is dipped in a 10–50% $H_2SO_4$ solution at 50–70° C. Brittle oxide films, passive films and denatured layers such as a Cr-poor layer are removed from the surface by pickling, and a fine metallic surface appears on the stainless steel sheet.

The pickled surface is then passivated, if necessary. Immersion in strong nitric acid is a representative passivating process. For instance, the pickled stainless steel sheet is dipped in a 10–60% $HNO_3$ solution at 40–60° C. for from several minutes to several hours. A thin Cr-enriched layer, which is generated by passivation, has low contact-resistance with the electrodes 2, 3 and is good of corrosion-resistance.

After pickling and optional passivation, the surface of the stainless steel sheet faced to the oxidizing electrode 2 is selectively roughened. The surface may be roughened in prior to passivation, or the roughened surface may be used as such at the oxidizing side without pickling or passivation.

The stainless steel sheet is roughened by electrolytic etching, chemical etching, ultrasonic honing or shot-blasting. Especially, alternating electrolytic etching in a ferric chloride solution is appropriate for reforming the surface to the state that many pits are formed over the whole surface with many fine projections standing close together around the pits, by repetition of anodic and cathodic electrolysis. Preferable conditions of the alternating electrolytic etching are: an anodic current density of 10.0 A/m$^2$ or less, an anodic energizing period of 0.05–1 second, a cathodic current density of 0.1–1 A/m$^2$, a cathodic energizing period of 0.01 second or longer and alternating cycle of 0.5–10 Hz.

When one surface of a stainless steel sheet faced to a fuel electrode 3 is pickled and optionally passivated, while the other surface faced to an oxidizing electrode 2 is roughened, the stainless steel sheet is reformed to an endurable state in inner atmospheres of a fuel cell. Consequently, a stainless steel separator, which endures a corrosive atmosphere without dissolution of metal ions, useful for a fuel cell is offered at a low cost.

The other features of the present invention will be apparent from the following examples, but the examples do not put any restrictions on the scope of the present invention.

EXAMPLE

Several austenitic and ferritic stainless steels, shown in Table 1, were prepared, 2-D finished and provided as separator materials. Each separator material was subjected to pickling, passivation, roughening or combination thereof.

TABLE 1

| Chemical Compositions (mass %) Of Stainless Steels | | | | | | |
|---|---|---|---|---|---|---|
| Steel Kind | C | Si | Mn | Ni | Cr | Mo |
| Austenite | 0.052 | 0.52 | 0.82 | 8.39 | 18.9 | — |
| Ferrite | 0.01 | 0.28 | 0.19 | 0.22 | 22.8 | 1.1 |

Pickling was performed by dipping the separator material 5 minutes in a 30%-$H_2SO_4$ solution at 60° C. Passivation was performed by dipping the separator material 2 hours in a 30%-$HNO_3$ solution at 60° C. Roughening was performed by electrolytic etching under conditions shown in Table 2. Some separator materials were pickled, roughened and then passivated under the same conditions.

TABLE 2

Conditions Of Alternating Electrolytic Etching

| Steel Kind | | Austenite | Ferrite |
|---|---|---|---|
| Electrolyte | $Fe^{3+}$ (g/l) | 55 | 30 |
| | temp. (° C.) | 57.5 | 50 |
| Anodic current density ($A/dm^2$) | | 30 | 35 |
| Cathodic current density ($A/dm^2$) | | 7.5 | 6 |
| Alternating cycle (Hz) | | 5 | 10 |
| Processing period (second) | | 60 | 40 |

The electrolyte was a ferric chloride solution.

Test pieces sampled from each processed separator material were examined by 90-hours humidity cabinet tests in hydrogen and oxygen atmospheres at 70° C. Contact-resistance between each test piece and a gas-diffusion electrode (a carbon electrode) was measured before and after the humidity tests, under the condition that the separator material was pressed onto the carbon electrode with a pressure of 10 kgf/cm², and change of contact-resistance was calculated. Results are shown in Table 3.

Each processed separator material was installed in a fuel cell in the manner such that it was held in contact with electrodes 2, 3. Just after fabrication of the fuel cell, contact-resistance was measured as a sum at both sides of the oxidizing electrode 2 and the fuel electrode 3. Contact resistance was also measured in the same way, after the fuel cell was continuously driven for 100 hours.

Results are shown in Tables 4 and 5. It is noted that the fuel cell was driven with high performance for a long term without substantial increase of contact-resistance by use of a stainless steel separator, whose surface faced to the oxidizing electrode 2 was selectively roughened. Drain from any fuel cell provided with stainless steel separator processed according to the present invention did not contain metal ions.

On the other hand, significant decrease of power-generating efficiency was detected due to increase of contact-resistance, after the continuous driving test of fuel cells (comparative examples) provided with a stainless steel separator having both surfaces pickled or passivated without selective roughening.

TABLE 3

Change Of Contact-Resistance ($m\Omega \cdot cm^2$) By Humidity Test

| | | Hydrogen (70° C., 98% RH) | | | | Air (70° C., 98% RH) | | | |
|---|---|---|---|---|---|---|---|---|---|
| Humid Atmosphere | | Before test | | after test | | before test | | after test | |
| Steel Kind | | γ | α | γ | α | γ | α | γ | α |
| Surface Condition | Un-processed (as 2D-finished) | 210 | 180 | 220 | 170 | 210 | 180 | 230 | 210 |
| | Pickled | 7.9 | 5.6 | 11.0 | 7.3 | 7.3 | 5.8 | 15.7 | 19.6 |
| | Passivated | 10.5 | 7.8 | 12.4 | 8.6 | 9.4 | 7.7 | 13.4 | 14.6 |
| | Roughened | 6.0 | 6.5 | 7.8 | 7.2 | 10.3 | 7.7 | 10.6 | 8.1 |
| | Roughened And pickled | 5.1 | 5.6 | 6.3 | 7.1 | 6.5 | 6.2 | 7.9 | 7.8 |
| | Roughened, pickled and passivated | 4.5 | 5.4 | 5.9 | 6.8 | 4.8 | 5.8 | 5.4 | 6.6 |

γ: 2-D finished austenitic stainless steel sheet
α: 2-D finished ferritic stainless steel sheet

TABLE 4

Change Of Contact Resistance Of Stainless Steel Separator Of Fuel Cell After 100-Hours Driving (separator material: austenitic stainless steel)

| Processed Condition Of Stainless Steel Separator | | Contact Resistance ($m\Omega \cdot cm^2$) | | | |
|---|---|---|---|---|---|
| Fuel Electrode Side | Oxidizing Electrode Side | Before Test | After test | Increase | NOTE |
| 2D-finsihed→pickled | as-electrolytically roughened | 18.2 | 21.6 | 3.4 | Inventive |
| 2D-finsihed→pickled | electrolytic roughening→pickled | 13.0 | 17.6 | 4.3 | Examples |
| 2D-finsihed→pickled | electrolytic roughening→passivated | 12.7 | 16.4 | 3.7 | |
| 2D-finsihed→passivated | as-electrolytically roughened | 20.8 | 23.0 | 2.2 | |
| 2D-finsihed→passivated | electrolytic roughening→pickled | 17.0 | 20.3 | 2.5 | |
| 2D-finsihed→passivated | electrolytic roughening→passivated | 15.3 | 17.8 | 2.5 | |
| 2D-finsihed→pickled | 2D-finsihed→pickled | 15.2 | 26.7 | 11.5 | Comparative |
| 2D-finsihed→pickled | 2D-finsihed→passivated | 17.3 | 24.4 | 7.1 | Examples |
| 2D-finsihed→passivated | 2D-finsihed→pickled | 17.8 | 28.1 | 10.3 | |
| 2D-finsihed→passivated | 2D-finsihed→passivated | 19.9 | 25.8 | 5.9 | |

TABLE 5

Change Of Contact Resistance Of Stainless Steel Separator Of Fuel Cell After 100-Hours Driving
(separator material: ferritic stainless steel)

| Processed Condition Of Stainless Steel Separator | | Contact Resistance (mΩ · cm²) | | | NOTE |
|---|---|---|---|---|---|
| Fuel Electrode Side | Oxidizing Electrode Side | Before Test | After test | Increase | |
| 2D-finsihed→pickled | as-electrolytically roughened | 14.5 | 18.6 | 4.1 | Inventive |
| 2D-finsihed→pickled | electrolytic roughening→pickled | 10.0 | 14.2 | 4.2 | Example |
| 2D-finsihed→pickled | electrolytic roughening→passivated | 10.3 | 14.3 | 4.0 | |
| 2D-finsihed→passivated | as-electrolytically roughened | 18.5 | 20.3 | 1.8 | |
| 2D-finsihed→passivated | electrolytic roughening→pickled | 14.2 | 16.1 | 1.9 | |
| 2D-finsihed→passivated | electrolytic roughening→passivated | 14.4 | 16.5 | 2.1 | |
| 2D-finsihed→pickled | 2D-finished→pickled | 10.0 | 21.0 | 11.0 | Comparative |
| 2D-finsihed→pickled | 2D-finished→passivated | 14.2 | 20.7 | 6.5 | Examples |
| 2D-finsihed→passivated | 2D-finished→pickled | 14.3 | 24.2 | 9.9 | |
| 2D-finsihed→passivated | 2D-finished→passivated | 18.2 | 24.2 | 6.0 | |

According to the present invention as above-mentioned, a stainless steel sheet good of corrosion-resistance is used as a separator for a fuel cell. Its surface faced to an oxidizing electrode in a severely corrosive atmosphere at a low pH value is roughened, so as to suppress increase of contact-resistance between the separator and the oxidizing electrode. The other surface faced to a fuel electrode is pickled and optionally passivated, so as to inhibit dissolution of metal ions which are likely to invade into a solid macromolecular membrane. Since each surface of the stainless steel separator is reformed to a state suitable at each side of the oxidizing and fuel electrodes in this way, the separator endures a corrosive atmosphere in a fuel cell and holds contact-resistance between the separator and the electrodes at a low level. Consequently, a fuel cell installing the stainless steel separator therein maintains high power-generating efficiency for a long term.

The invention claimed is:

1. A stainless steel separator for a low-temperature fuel cell comprising a stainless steel sheet having differently treated surfaces, one surface faced to a fuel electrode being pickled and the opposite surface, faced to an oxidizing electrodes, being roughened.

2. The stainless steel separator defined by claim 1, wherein the surface faced to the fuel electrode is pickled and passivated.

3. The stainless steel separator defined by claim 1, wherein the roughened surface faced to the oxidizing electrode is pickled or passivated.

* * * * *